(12) United States Patent
Kim

(10) Patent No.: US 10,826,200 B2
(45) Date of Patent: Nov. 3, 2020

(54) POWER CONNECTOR DEDICATED TO HEATING FILM

(71) Applicant: SH KOREA CO., LTD., Busan (KR)

(72) Inventor: Yi Tae Kim, Busan (KR)

(73) Assignee: SH KOREA CO., LTD. (KR)

( * ) Notice: Subject to any disclaimer, the term of this patent is extended or adjusted under 35 U.S.C. 154(b) by 0 days.

(21) Appl. No.: 16/562,595

(22) Filed: Sep. 6, 2019

(65) Prior Publication Data

US 2019/0393620 A1    Dec. 26, 2019

Related U.S. Application Data

(63) Continuation of application No. PCT/KR2018/003995, filed on Apr. 4, 2018.

(30) Foreign Application Priority Data

Apr. 4, 2017  (KR) .......................... 10-2017-0043589

(51) Int. Cl.
*H01R 33/945*  (2006.01)
*H01R 4/06*    (2006.01)
(Continued)

(52) U.S. Cl.
CPC .............. *H01R 4/06* (2013.01); *H01R 12/57* (2013.01); *H01R 13/04* (2013.01); *H01R 13/443* (2013.01); *H05B 3/08* (2013.01); *H05B 3/20* (2013.01)

(58) Field of Classification Search
CPC ...... H01R 13/04; H01R 13/443; H01R 12/57; H01R 4/06; H05B 3/08; H05B 3/20
(Continued)

(56) References Cited

U.S. PATENT DOCUMENTS

| | | | | |
|---|---|---|---|---|
| 2,569,961 A | * | 10/1951 | Tidd | F24D 13/024 |
| | | | | 219/213 |
| 2,745,943 A | * | 5/1956 | Safford | H05B 1/02 |
| | | | | 219/542 |

(Continued)

FOREIGN PATENT DOCUMENTS

| CN | 200992793 Y | 12/2007 |
|---|---|---|
| CN | 203690658 U | 7/2014 |

(Continued)

OTHER PUBLICATIONS

International Search Report (PCT/KR2018/003995), WIPO, dated Aug. 14, 2018.
(Continued)

*Primary Examiner* — Abdullah A Riyami
*Assistant Examiner* — Vladimir Imas
(74) *Attorney, Agent, or Firm* — Park & Associates IP Law, P.C.

(57) ABSTRACT

A power connector dedicated to a heating film includes: a male connector formed in a rectangular thin plate shape, having a power inlet plug formed as a thin plate-shaped electrode on a right side thereof, having a first electrode for wiring a heating film formed as a thin plate-shaped electrode on an upper side, and having a left side to which a power cable internally wired to the power inlet plug is connected; and a female connector formed in a rectangular thin plate shape, having a right side to which the power cable is connected, having a second electrode for wiring a heating film formed as a thin plate-shaped electrode on a right side thereof, and having a power outlet socket wired to the power inlet plug.

8 Claims, 12 Drawing Sheets

(51) Int. Cl.
*H01R 12/57* (2011.01)
*H01R 13/04* (2006.01)
*H01R 13/443* (2006.01)
*H05B 3/08* (2006.01)
*H05B 3/20* (2006.01)

(58) Field of Classification Search
USPC .................................................. 439/577, 502
See application file for complete search history.

(56) References Cited

U.S. PATENT DOCUMENTS

| | | | | |
|---|---|---|---|---|
| 2,745,944 A * | 5/1956 | Price | ........................ | A61F 7/007 |
| | | | | 219/505 |
| 3,160,736 A * | 12/1964 | Catterson | ................. | A47G 1/02 |
| | | | | 219/219 |
| 3,260,935 A | 7/1966 | Frank J Soukey et al. | | |
| 3,523,542 A * | 8/1970 | Eisler | ........................ | A45D 4/12 |
| | | | | 132/229 |
| 3,573,430 A * | 4/1971 | Eisler | ................. | B65D 81/3476 |
| | | | | 219/385 |
| 3,694,622 A * | 9/1972 | Bentley | ................... | H05B 3/146 |
| | | | | 219/213 |
| 3,813,520 A * | 5/1974 | Brouneus | ............... | H05B 3/265 |
| | | | | 219/543 |
| 3,887,788 A * | 6/1975 | Seibel | ...................... | A47G 1/02 |
| | | | | 219/219 |
| 3,931,496 A * | 1/1976 | Hurko | ...................... | H05B 3/06 |
| | | | | 219/543 |
| 4,500,865 A * | 2/1985 | Tanaka | ................... | G01L 1/2287 |
| | | | | 338/13 |
| 4,628,187 A * | 12/1986 | Sekiguchi | ............. | B60R 1/0602 |
| | | | | 219/505 |
| 4,794,691 A * | 1/1989 | Brandeau | ............... | H01R 12/69 |
| | | | | 29/861 |
| 5,198,640 A * | 3/1993 | Yang | ........................ | H01C 1/02 |
| | | | | 219/505 |
| 5,213,523 A * | 5/1993 | Hygema | ............ | H01R 13/6616 |
| | | | | 219/541 |
| 5,252,944 A * | 10/1993 | Caddock, Jr. | .......... | H01C 1/084 |
| | | | | 257/675 |
| 5,404,214 A * | 4/1995 | Yoshimoto | ......... | G03G 15/2064 |
| | | | | 219/216 |
| 5,475,199 A * | 12/1995 | Buchanan | ............... | H05B 3/262 |
| | | | | 156/579 |
| 5,521,357 A * | 5/1996 | Lock | ...................... | H05B 3/262 |
| | | | | 219/541 |
| 5,935,475 A * | 8/1999 | Scoles | ................. | B29C 66/0344 |
| | | | | 219/633 |
| 6,037,572 A * | 3/2000 | Coates | ..................... | H05B 3/26 |
| | | | | 219/451.1 |
| 6,124,579 A * | 9/2000 | Steinhauser | ......... | H05B 1/0291 |
| | | | | 219/523 |
| 6,263,158 B1 * | 7/2001 | Rutherford | .............. | H05B 3/36 |
| | | | | 219/544 |
| 6,392,206 B1 * | 5/2002 | Von Arx | ............ | A47G 19/2288 |
| | | | | 219/468.1 |
| 6,392,208 B1 * | 5/2002 | Arx | ........................ | B29C 65/02 |
| | | | | 219/544 |
| 6,433,317 B1 * | 8/2002 | Arx | .................... | A47G 19/2288 |
| | | | | 219/468.1 |
| 6,720,500 B1 * | 4/2004 | Inoue | .................... | H01L 21/563 |
| | | | | 174/258 |
| 6,770,848 B2 * | 8/2004 | Haas | .................. | A41D 13/0051 |
| | | | | 219/212 |
| 7,002,115 B2 * | 2/2006 | Gerhardinger | ........ | A47F 3/0434 |
| | | | | 219/203 |
| 7,076,183 B2 * | 7/2006 | Kawazu | ............. | G03G 15/2039 |
| | | | | 219/216 |
| 7,120,354 B2 * | 10/2006 | Mackie | ................. | A61M 16/08 |
| | | | | 392/480 |
| 7,247,047 B2 * | 7/2007 | Baranski | .............. | H01Q 1/1271 |
| | | | | 439/495 |
| 7,407,393 B2 * | 8/2008 | Ni | .................... | G06K 19/07732 |
| | | | | 361/715 |
| 7,714,257 B2 * | 5/2010 | Pilavdzic | ............. | B29C 45/2737 |
| | | | | 219/541 |
| 7,862,375 B2 * | 1/2011 | Oosterling | ............... | H05B 3/36 |
| | | | | 439/606 |
| 8,686,683 B2 * | 4/2014 | Caskey | ................. | H01R 35/04 |
| | | | | 320/107 |
| 8,890,038 B2 * | 11/2014 | Abbott | ................. | H05B 6/1272 |
| | | | | 219/466.1 |
| 9,204,496 B2 * | 12/2015 | Hanada | .................. | H05B 3/845 |
| 9,642,191 B2 * | 5/2017 | Everett, Jr. | ............. | H05B 3/68 |
| 2010/0282090 A1 * | 11/2010 | Etter | ..................... | A47J 31/542 |
| | | | | 99/288 |
| 2011/0284522 A1 * | 11/2011 | Hsieh | ................... | H01R 13/743 |
| | | | | 219/541 |
| 2014/0349515 A1 * | 11/2014 | Timmermann | ......... | B32B 37/12 |
| | | | | 439/527 |

FOREIGN PATENT DOCUMENTS

| | | | |
|---|---|---|---|
| JP | 2004-220983 A | 8/2004 | |
| JP | 2005-294093 A | 10/2005 | |
| KR | 10-1999-0078613 A | 11/1999 | |
| KR | 10-2003-0037596 A | 5/2003 | |
| KR | 20-0354698 Y1 | 4/2004 | |
| KR | 10-2005-0017477 A | 2/2005 | |
| KR | 20-0380064 Y1 | 3/2005 | |
| KR | 10-1114516 B1 | 2/2012 | |
| KR | 10-2013-0009062 A | 1/2013 | |
| KR | 10-1474486 B1 | 12/2014 | |
| KR | 10-2015-0040512 A | 4/2015 | |

OTHER PUBLICATIONS

Korean Notice of Allowance (KR 10-2017-0043589), KIPO, dated Jul. 14, 2017.

* cited by examiner

POWER CONNECTOR DEDICATED TO HEATING FILM

REFERENCE TO RELATED APPLICATIONS

This is a continuation of International Patent Application PCT/KR2018/003995 filed on Apr. 4, 2018, which designates the United States and claims priority of Korean Patent Application No. 10-2017-0043589 filed on Apr. 4, 2017, the entire contents of which are incorporated herein by reference.

FIELD OF THE INVENTION

The present invention relates to a power connector dedicated to a heating film, the power connector being characterized by including: a male connector formed in a rectangular thin plate shape, having a power inlet plug formed on a right side thereof, having a first electrode for wiring a heating film formed on an upper side, and having a left side to which a power cable internally wired to the power inlet plug is connected; and a female connector formed in a rectangular thin plate shape, having a right side to which the power cable is connected, having a second electrode for wiring a heating film formed on a right side thereof, and having a power outlet socket wired to the power inlet plug, in which the power cable is adjusted in length in accordance with a distance of a copper electrode of the heating film and is wired in a plane shape to the copper electrode of the heating film that is constructed flat, and power is connected to a plurality of sequential heating films by continuously maintaining connection of the male connectors and the female connectors.

BACKGROUND OF THE INVENTION

In general, planar heat elements using a carbon heating film are easy to adjust in temperature, are sanitary, and do not generate noise, so they are widely used for heating apparatuses for homes use such as an apartment, a house, and a vacation condominium, heating apparatuses of commercial buildings, heating apparatuses for industry such as a work site, a warehouse, and a barn Further, products manufactured by integrating a heating element and a shield layer have been introduced, as in Korea Patent Application No. 1020110069867 and Korean Patent Application No. 1020010068850.

In general, heating films are constructed flat on floors for floor heating.

However, heating films are formed in a thin plane, but in general, an interior power plug is used at it is or, as shown in FIG. 16, cables are randomly cut and used for the apparatus that supplies power to the heating films.

According to these types of the related art, when a connector for supplying power to a heating film protrudes from a floor, it protrudes from a plane even after construction, which is bad for the external appearance and causes inconvenience in maintenance and conservation of the floor with the heating film installed thereon.

Further, a heating film and a power are randomly connected, as shown in FIG. 16 (B-1: front side and B-2: rear side), which is dangerous due to protruding spirals and increases a possibility of a fire by heat generation due to poor connection at a connecting portion through which a high current flows.

SUMMARY OF THE INVENTION

The present invention has been made in an effort to solve the problems and an object of the present invention is to provide a power connector dedicated to a heating film, the power connector enabling simple connection between a heating film and a power, reducing construction efforts and cost, and making a power connection construction be a part of a planar construction of the heating film.

In order to achieve the objects of the present invention, a power connector dedicated to a heating film includes: a male connector formed in a rectangular thin plate shape, having a power inlet plug formed on a right side thereof, having a first electrode for wiring a heating film formed on an upper side, and having a left side to which a power cable internally wired to the power inlet plug is connected; and a female connector formed in a rectangular thin plate shape, having a right side to which the power cable is connected, having a second electrode for wiring a heating film formed on a right side thereof, and having a power outlet socket wired to the power inlet plug, in which the power cable is adjusted in length in accordance with a distance of a copper electrode of the heating film and is wired in a plane shape to the copper electrode of the heating film that is constructed flat, and power is connected to a plurality of sequential heating films by continuously maintaining connection of the male connectors and the female connectors.

A heating film mounting slot in which the heating film is fitted to set a coupling position may be formed on an upper side of each of the female connector and the male connector, so the heating film may be inserted into the heating film mounting slot and an electrode coupling position may be determined, and then the first electrode for wiring a heating film and the second electrode for wiring a heating film may be wired to the cooper electrode of the heating film.

Further, the first electrode for wiring a heating film and the second electrode for wiring a heating film may be formed as thin plate-shaped electrodes with a through-hole at an end, may be inserted between a laminating film of the heating film and a cooper electrode of the heating film, and then may be fixed together with the heating film in the through-holes by a hole tack, thereby being wired to the cooper electrode of the heating film.

Further, the power connector dedicated to a heating film may be exclusively used for a heating film having a ground electrode by forming the power inlet plug as a plug to which three single-phased interior power lines (an activation line, a neutral line, and a ground line) are connected, forming the first electrode for wiring a heating film to include a ground electrode, and forming the power cable and the power outlet socket to include a ground track.

Further, the female connector may further include a cap plug inserted in the power outlet socket, so when there is not male connector of another power connector to be coupled to the female connector, electrical safety is performed by inserting the cap plug.

According to the present invention, there is an advantage of providing a power connector dedicated to a heating film enabling simple connection between a heating film and a power, reducing construction efforts and cost, and making a power connection construction be a part of a planar construction of the heating film.

DETAILED DESCRIPTION OF THE INVENTION

Hereafter, the present invention is described with reference to the drawings, and in the following description of the present invention, detailed descriptions of well-known technologies or configurations relating to the present invention will not be provided so as not to obscure the description of the present invention with unnecessary details.

Further, terms to be described below are terms defined in consideration of the functions in the present invention and may be different, depending on the intention of users and operator and customs, so the definition should be made on the basis of the description throughout the entire specification of the present invention.

Figure 1:
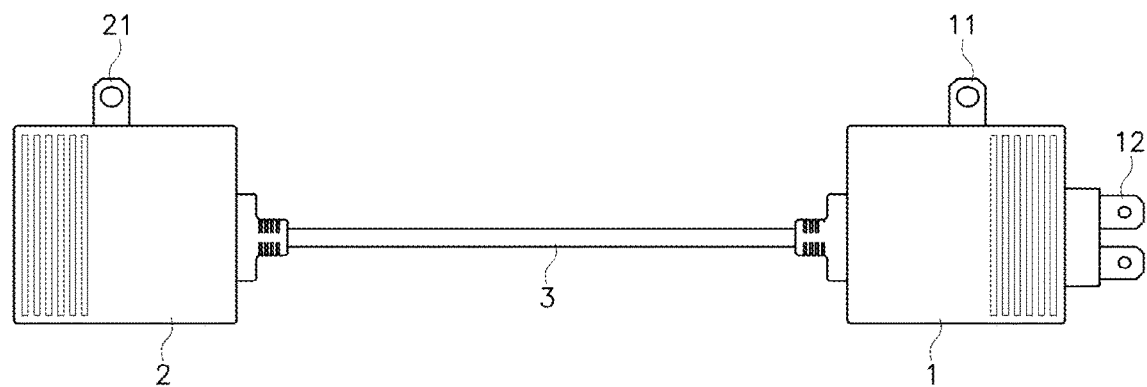
FIG. 1 is a front view of the present invention.
Figure 2:
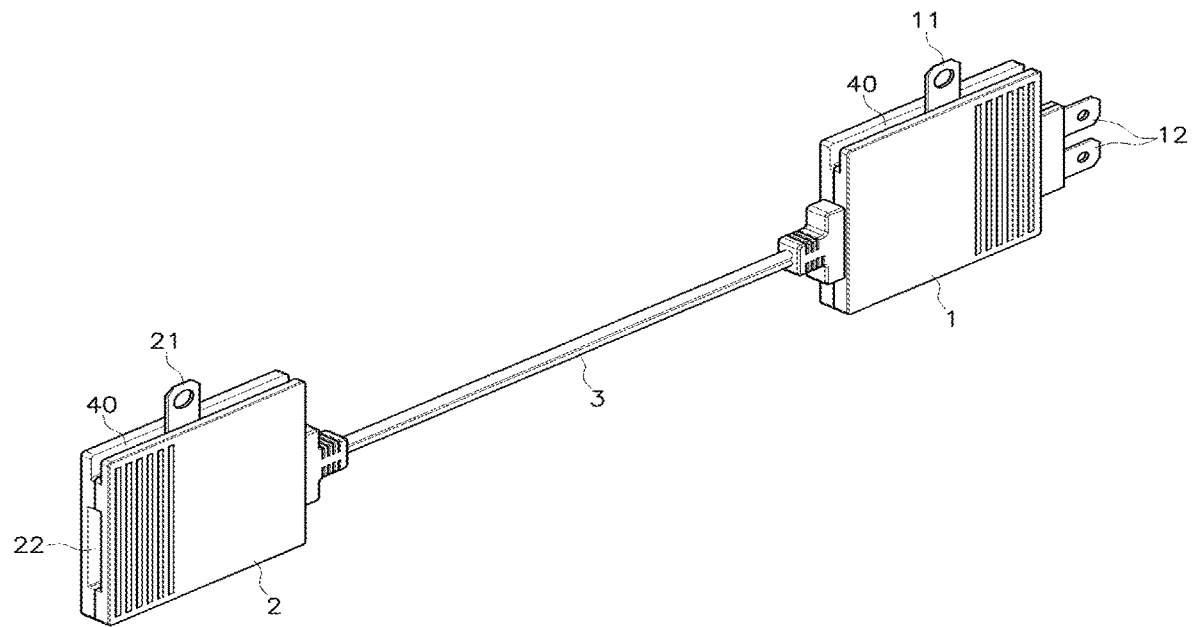
FIG. 2 is a perspective view of the present invention.
Figure 3:
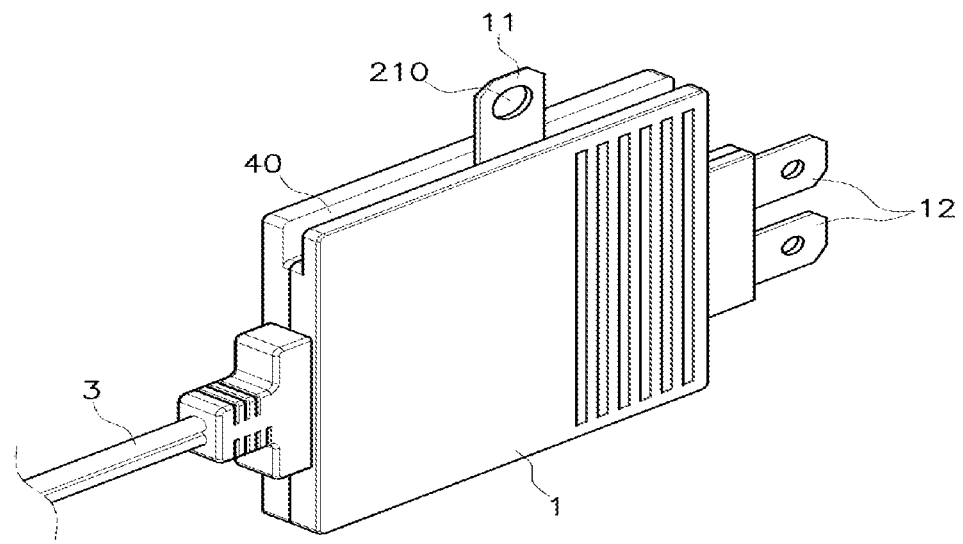
FIG. 3 is an enlarged perspective view of a male connector of the present invention.
Figure 4:
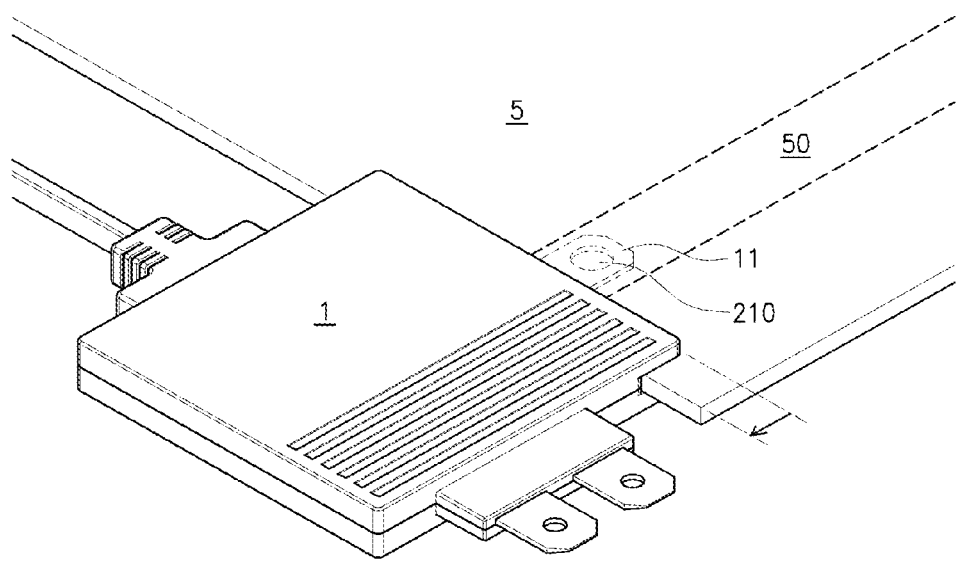
FIG. 4 is a perspective view of wiring between a male connector and a heating film of the present invention.
Figure 5:
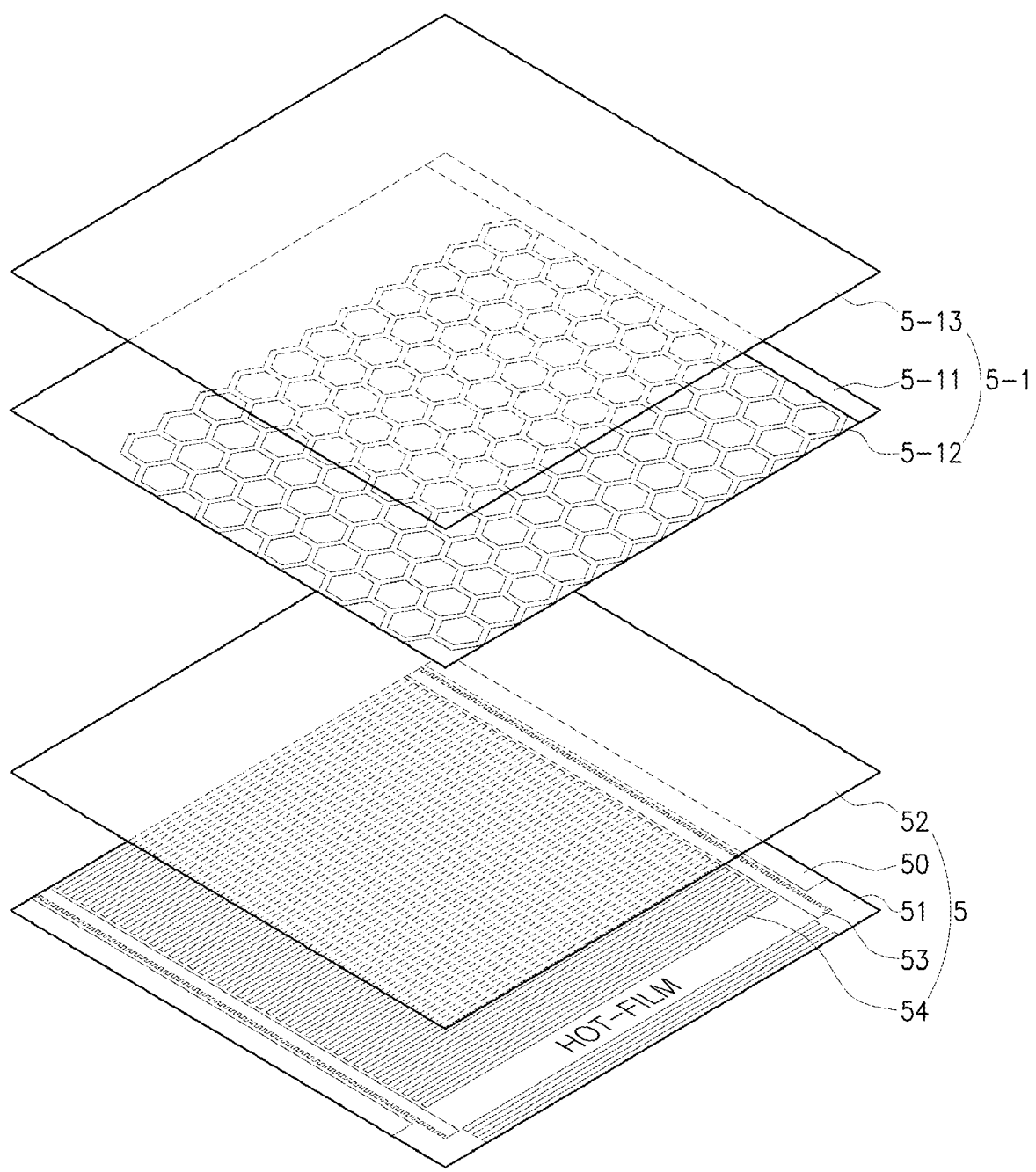
FIG. 5 is a view a stacked structural view of heating films.
Figure 8:
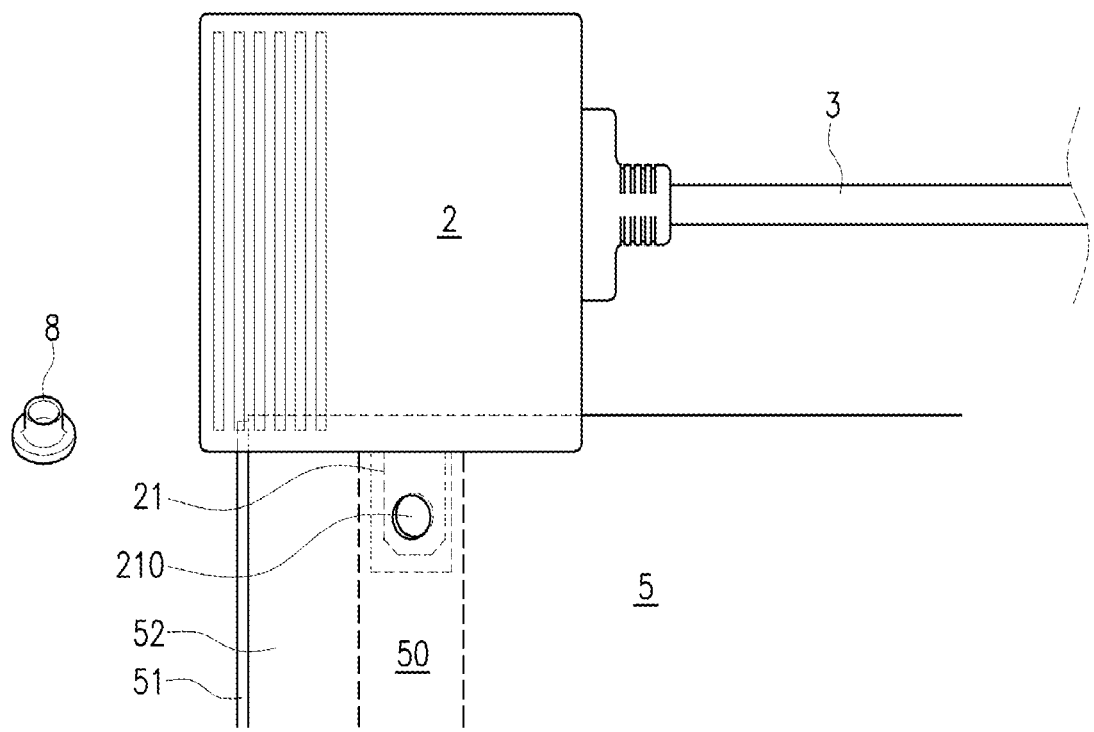
Figure 9:
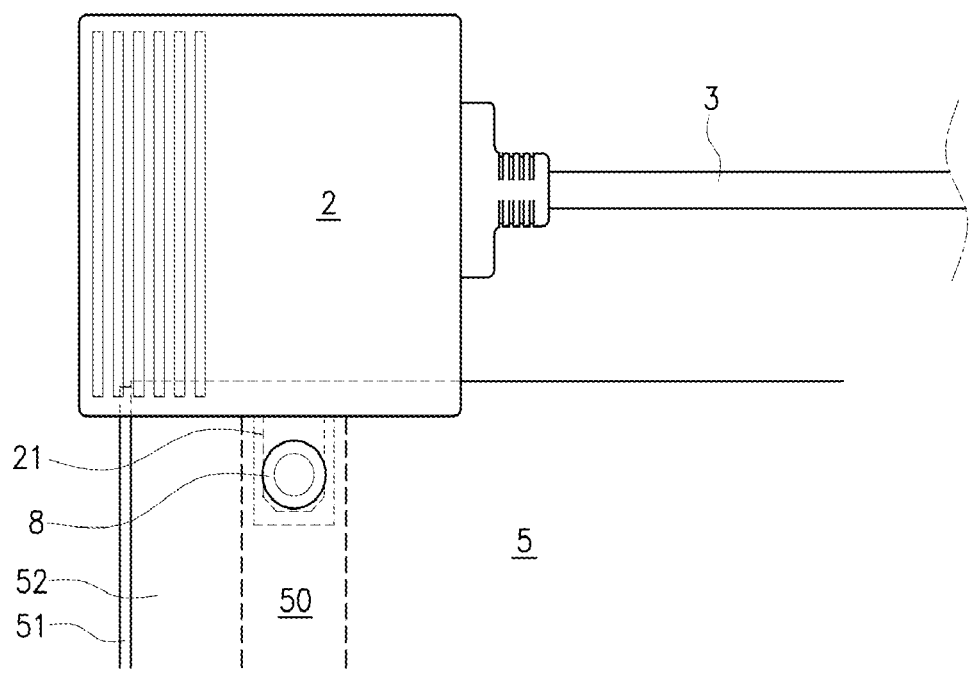
Figure 10:
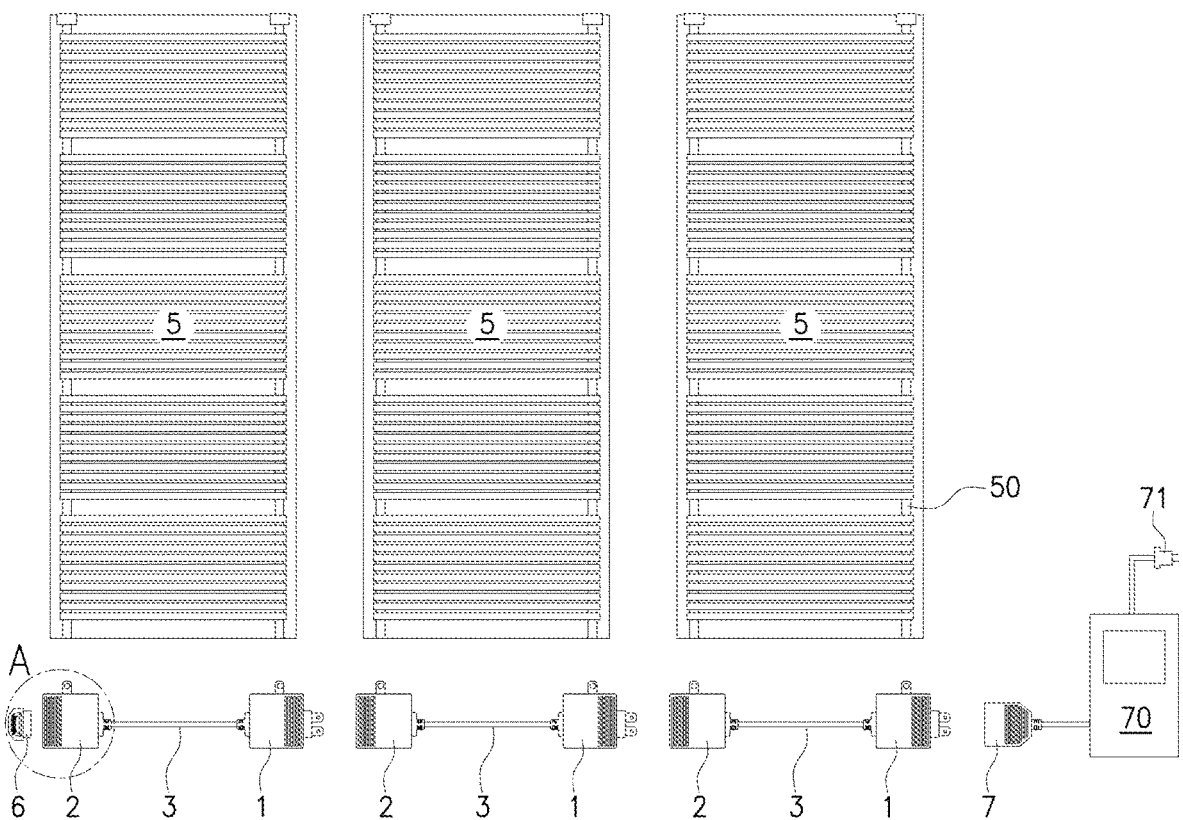
FIG. 10 is a view of exemplary use of the present invention.
Figure 11:
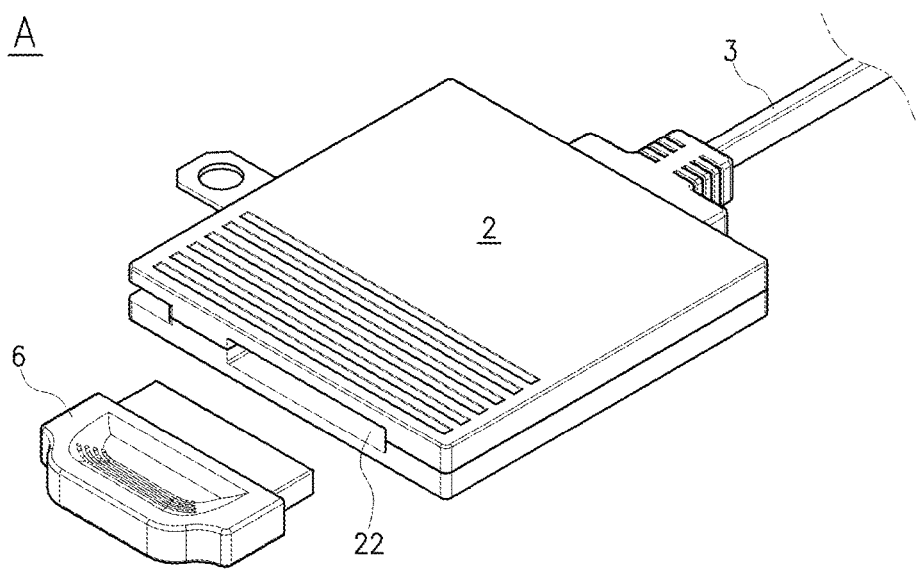
FIG. 11 is a partial enlarged view of the portion A of FIG. 10.
Figure 12:
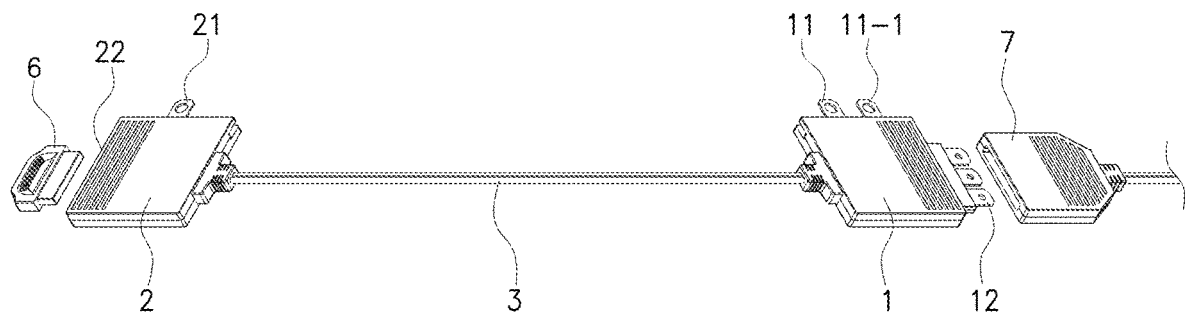
FIG. 12 is a structural view of another embodiment of the present invention.
Figure 13:
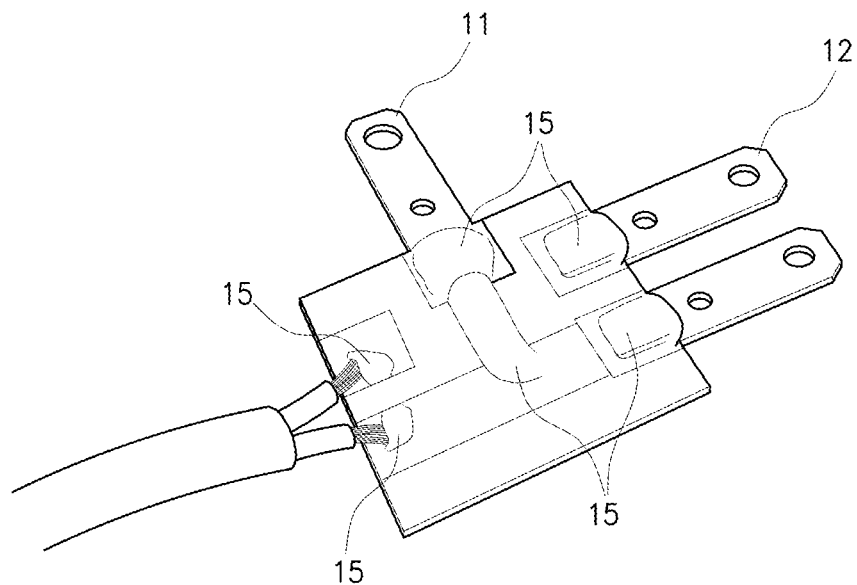
FIG. 13 is a structural view showing a wiring manner inside a male connector of the present invention.
Figure 14:
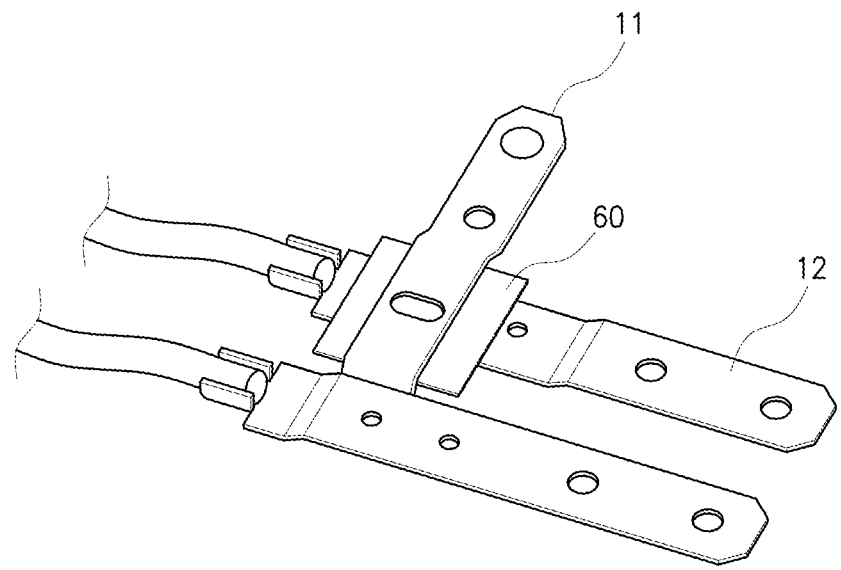
FIG. 14 is a structural view showing a wiring manner inside a male connector according to an embodiment of the present invention.
Figure 15:
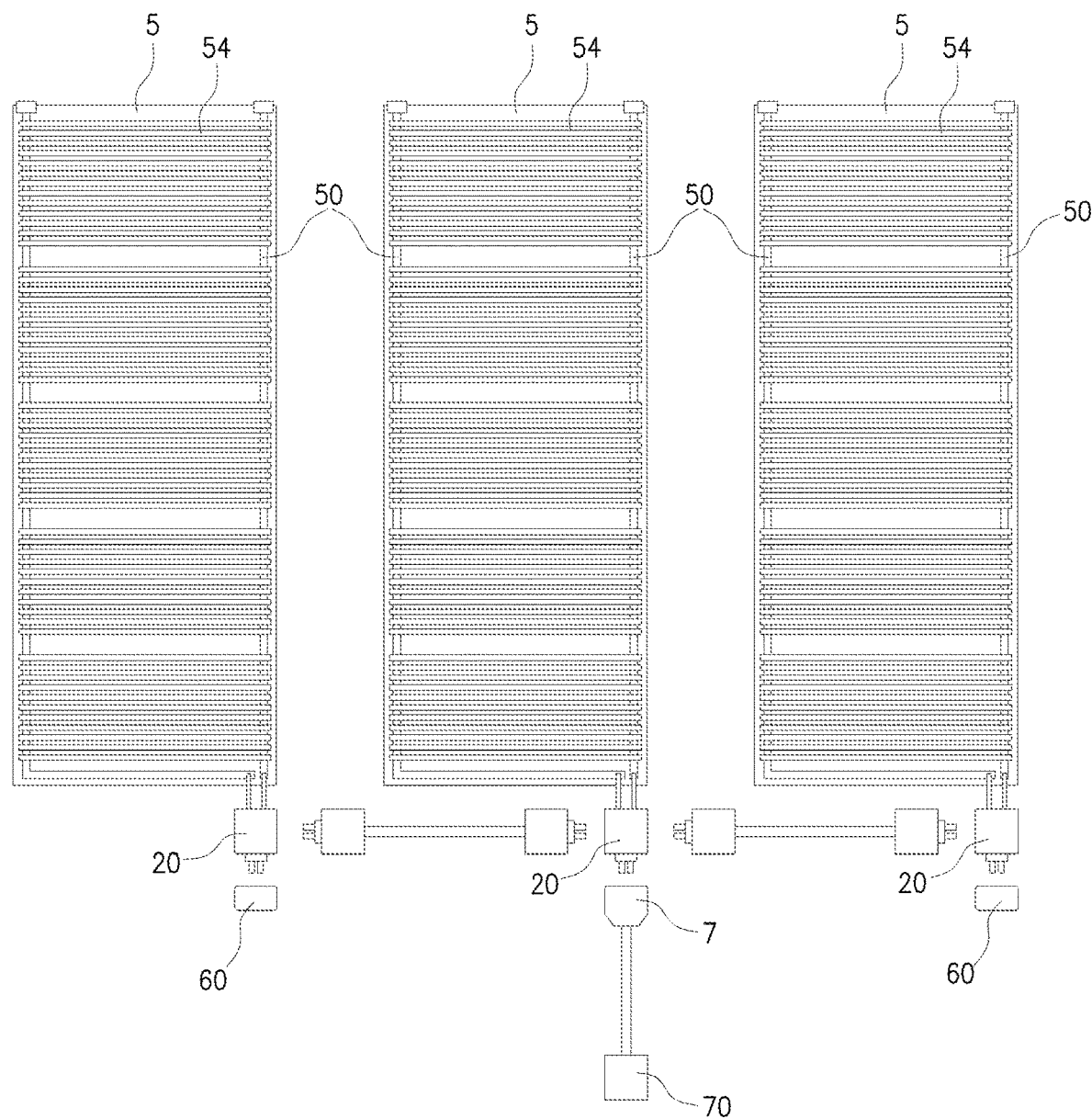
FIG. 15 is a view of exemplary use of another embodiment of the present invention.
Figure 16:
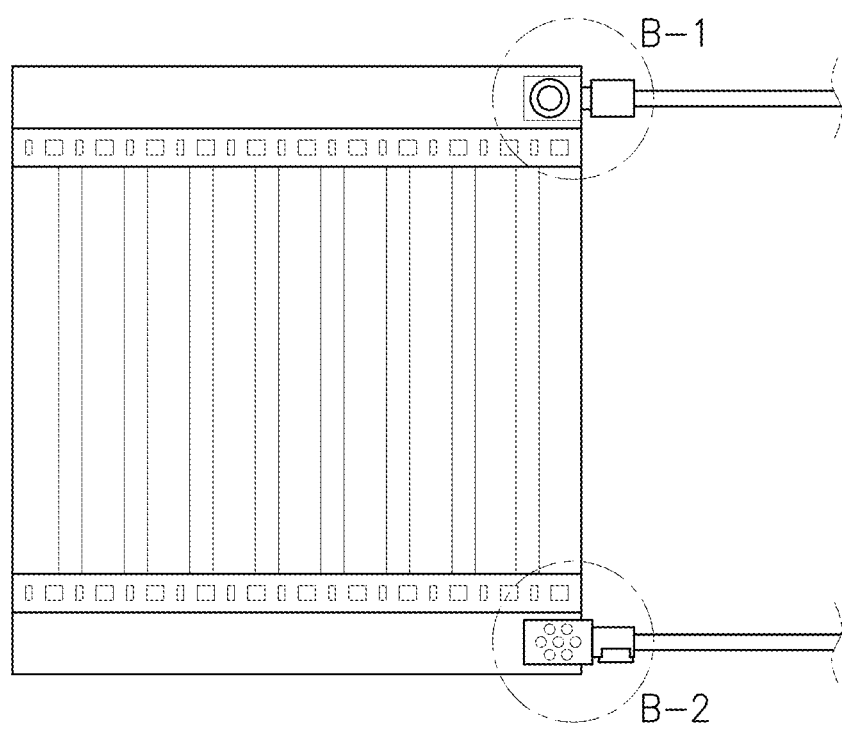
FIG. 16 is a picture of a heating film and a power wired in a manner of the related art.

FIG. 1 is a front view of the present invention, FIG. 2 is a perspective view of the present invention, FIG. 3 is an enlarged perspective view of a male connector of the present invention, FIG. 4 is a perspective view of wiring between a male connector and a heating film of the present invention, FIG. 5 is a view a stacking structural view of heating films, FIGS. 6 to 9 are pictures sequentially photographing a process of wiring the present invention to a heating film, FIG. 10 is a view of exemplary use of the present invention, FIG. 11 is a partial enlarged view of the portion A of FIG. 10, FIG. 12 is a structural view of another embodiment of the present invention, FIG. 13 is a structural view showing a wiring manner inside a male connector of the present invention, FIG. 14 is a structural view showing a wiring manner inside a male connector according to an embodiment of the present invention, FIG. 15 is a view of exemplary use of another embodiment of the present invention, and FIG. 16 is a picture of a heating film and a power wired in a manner of the related art.

(In the following description, terms 'left, right, up, and down' are based on the positions in FIG. 1 to describe the positions of components of the present invention)

As shown in FIGS. 1 and 2, the present invention relates to a power connector dedicated to a heating film, which is configured by connecting a male connector 1 having a power inlet plug 12, a heating film mounting slot 40, and a first electrode 11 for wiring a heating film, and a female connector 2 having a second electrode 21 for wiring a heating film, a heating film mounting slot 40, and a power outlet socket 22 to each other through a power cable 3.

As shown in FIG. 1, the male connector 1 and the female connector 2 are each formed in a rectangular thin plate shape and power connection terminal connected through the power cable 3.

In the present invention, the thin plate shapes of the male connector 1 and the female connector 2 are significant because the present invention is exclusively used for a heating film 5.

The heating film 5 is used for floor heating, so, as shown in FIG. 10, is generally constructed flat. Accordingly, when a connector for supplying power to the heating film 5 protrudes from a floor, which is bad for the external appearance even after construction, and causes inconvenience in maintenance and conservation of the floor with the heating film installed thereon In order to solve this problem, in the present invention, the male connector 1 and the female connector 2 are formed in thin plate shapes, as shown in FIGS. 1 and 2, to prevent the heating film 5 from protruding from a construction surface.

Referring to FIGS. 1 and 2, the male connector 1 and the female connector 2 are formed in a symmetric structure with the power cable 3 therebetween.

The male connector 1 has a power inlet plug 12 on the right side, a first electrode 11 for wiring a heating film on the upper side, and a power inlet plug 12 on the left side to which the power cable 3 is internally wired.

As shown in FIG. 10, the heating film 5 is generally connected to a temperature adjuster to be supplied with power and the temperature adjuster is composed of a controller 70 connected to an interior plug 71 to be supplied with power and a power socket 7 through with power is output.

The power inlet plug 12 of the present invention, as shown in FIG. 10, has a shape that is coupled to the power socket 7.

The female connector 2 is connected with the power cable 3 on the right side, and has a second electrode 21 for wiring on the upper side and a power outlet socket 22, which is internally wired to the power cable 3 and is wired to the power inlet plug 12, on the left side.

The terms of male connector 1 and the female connector 2 were determined on the basis of the structures wired to each other by the power inlet plug 12 and the power outlet socket 22, as show in FIG. 10.

The length of the power cable connecting the male connector 1 and the female connector 2 is adjusted in accordance with a copper electrode distance of the heating film.

According to the present invention having this configuration, there is provided a power connector dedicated to a heating film that is wired in a plate shape to a copper electrode of a heating film, which is constructed flat, and becomes a part of a planar construction with the heating film after constructed (hereafter, referred to as 'planar construction').

Meanwhile, the power inlet plug 12, as shown in FIG. 10, is configured in a shape that is coupled to the power socket 7. Since the object of the present invention is a power connector dedicated to a heating film that becomes a part of a planar construction, the power inlet plug 12, and the power outlet socket 22 and the power socket 7 that are wired to the power inlet plug are also formed in a thin plate shape.

Further, as shown in FIG. 10, since a plurality of heating films 5 is sequentially constructed, depending on the construction area, heating films to which the power connector dedicated to a heating film is wired are arranged in parallel and then adjacent male connector 1 and female connector 2 are connected to each other, whereby the heating films are sequentially connected to a power supply.

Therefore, according to the present invention, there is provided a power connector dedicated to a heating power that is simply constructed only by connecting adjacent connectors without separate wiring for connecting a heating film 5 that is far from an interior power inlet to a power supply, and that becomes a part of a planar construction without damaging the flat surface of the heating film construction surface.

Meanwhile, a heating film mounting slot 40 in which the heating film 5 is fitted to set the coupling position is formed on the upper side of the female connector 2 and the male connector 1 of the present invention, as shown in FIG. 3.

The heating film mounting slot 40, which is a space in which a heating film is fitted, as shown in FIG. 4, fixes the position where the first electrode 11 for wiring a heating film and the second electrode 21 for wiring a heating film are wired to a copper electrode of the heating film.

That is, the power connector dedicated to a heating film of the present invention has an object that supplies power by being sequentially connected to a power connector dedicated to a heating film wired to an adjacently arranged a heating film, as shown in FIG. 10, which is possible only when the present invention is wired at the same position to heating films 5.

The heating film mounting slot 40 is provided for this purpose. When the heating film 5 is inserted in the heating film mounting slot 40, as shown in FIG. 4, the position where the first electrode 11 for wiring a heating film and the second electrode 21 for wiring a heating film are wired to a copper electrode 50 of the heating film is limited by an insertion distance, whereby a wiring position is determined.

As described above, according to the present invention, when the heating film 5 is constructed, the heating film 5 is inserted into the heating film mounting slot 40 such that the electrode coupling position is determined to be the same, and then the first electrode 11 for wiring a heating film and the second electrode 21 for wiring a heating film are wired to the copper electrode 50, thereby being able to form heating films 5 having the same wiring position.

Meanwhile, other than determining the wiring position of the heating film 5, the heating film mounting slot 40 has another effect that enhances coupling of the heating film 5 and the present invention and protects the coupling portion of the heating film 5 because a portion of the heating film 5 is inserted in the present invention, as shown in FIG. 4.

As shown in FIGS. 1 to 4, the first electrode 11 for wiring a heating film and the second electrode 21 for wiring a heating film of the present invention are also formed as thin plate electrodes with a through-hole 210 at the end in consideration of technical matters for a planar construction.

Forming the first electrode 11 for wiring a heating film and the second electrode 21 for wiring a heating film as thin plate electrodes is for making them be a portion of a planar construction and also preparing wiring to a heating film.

That is, by forming the first electrode 11 for wiring a heating film and the second electrode 21 for wiring a heating film as thin plate electrodes, laminating films 51 and 52 of the heating film 5 are opened and then the electrodes are inserted, whereby they can be connected to the copper electrode of the heating film.

Hereafter, the structure of the heating film 5 is described to for explanation about implementation of the present invention.

FIG. 5 shows a stacked structure of ground type heating films as an example for describing implementation of the present invention and heating films 5 without a ground electrode 11-1 may be more frequently used.

As shown in FIG. 5, the heating film 5 is formed by sequentially stacking a lower laminating film 51, a carbon paste 54, and an upper laminating film 52, in which the copper electrode 50 of the heating film are connected to left and right sides of the carbon paste 54 to supply power to the carbon paste 54.

The ground type heating film is formed by additionally stacking a ground film 5-1 composed of a carbon pattern film 5-12, a surface laminating film 5-13, and a ground copper electrode 5-11 on the heating film 5.

Applying the present invention to a common heating film and a ground type hearting film is described hereafter.

Figure 6:
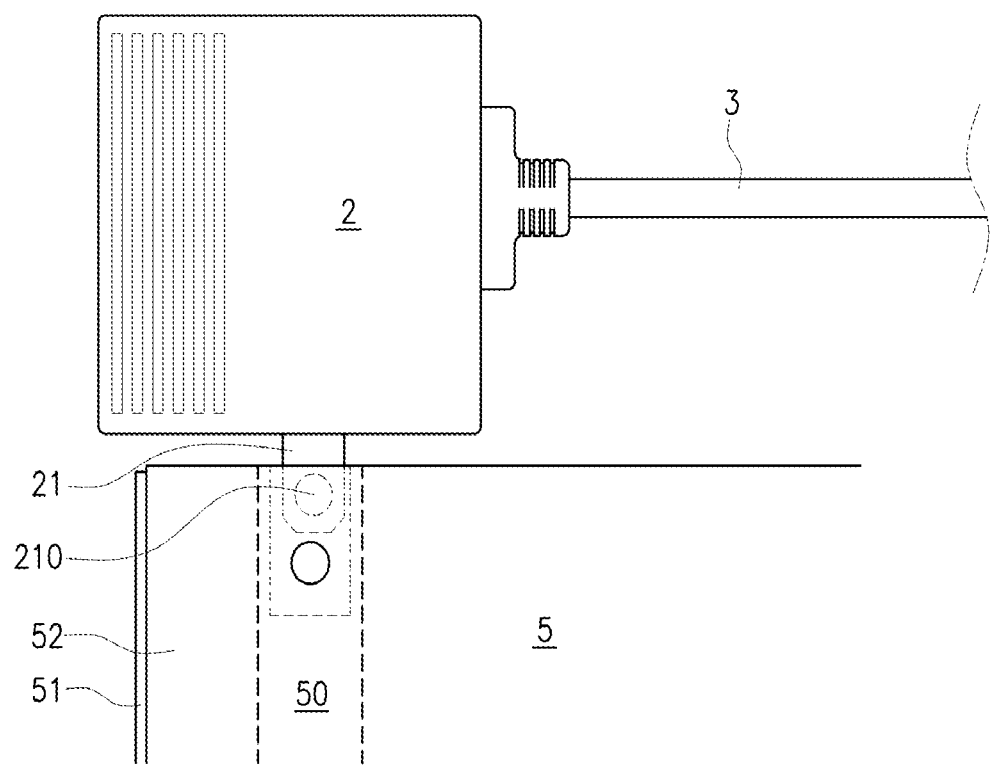
FIGS. 6 to 9 are pictures sequential photographing a process of wiring the present invention to a heating film.
Figure 7:
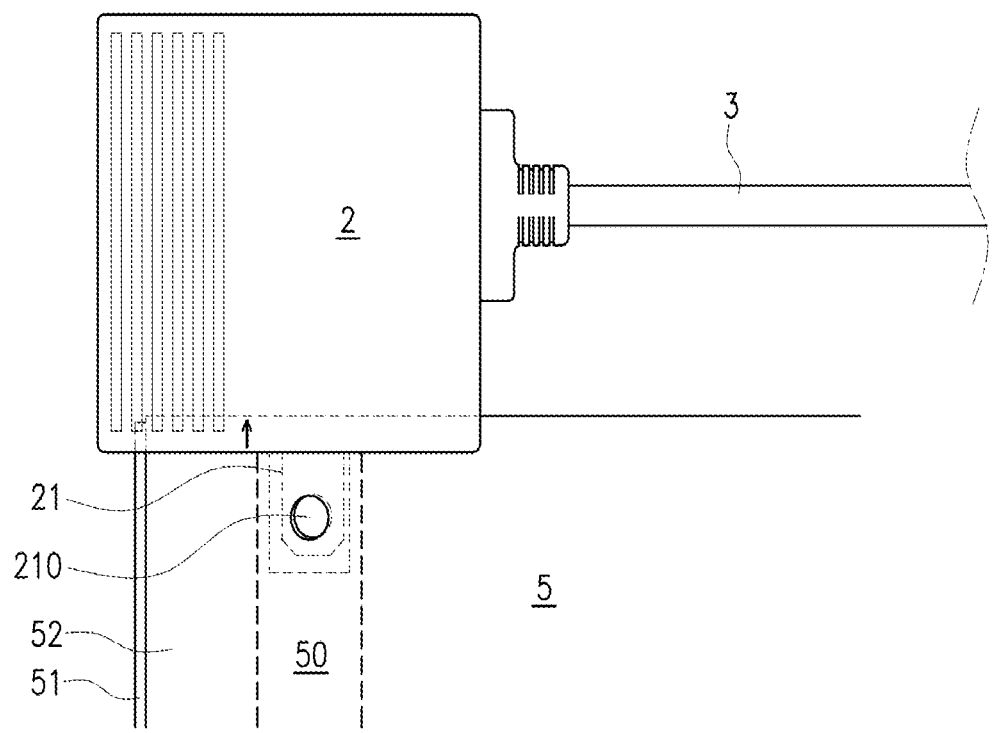

When the present invention is wired to a common heating film, as shown in FIG. 6, the laminating films 51 and 52 of the heating film of FIG. 5 are opened, and the first electrode 11 for wiring a heating film and the second electrode 21 for wiring a heating film are inserted and connected to the copper electrode 50 of the heating film, as shown in FIG. 6, are inserted into the heating film mounting slot 40, as shown in FIG. 7, and then are fixed to the through-hole 210 formed at the end, as shown in FIG. 9, by a hole tack 8 shown in FIG. 8, thereby being wired to the copper electrode 50 of the heating film.

The hole tack 8, as shown in FIG. 9, means a fixing pin that fixes an insertion by being inserted into the through-hole 210 and then pressed at both sides.

In the present invention, the first electrode 11 for wiring a heating film and the second electrode 21 for wiring a heating film are fixed to the copper electrode 50 by the hole tack 8, whereby they can be simply coupled at a construction site.

The present invention is characterized in that, as shown in FIG. 9, since the first electrode 11 for wiring a heating film and the second electrode 21 for wiring a heating film are inserted between the laminating films 51 and 52 of the heating film, the connection construction of the electrodes is insulating construction.

Safety is further secured by adding an insulation process after construction, but according to the present invention, the bore tack 8 is an insulating member and the connection construction of the electrodes is finished with an insulating process, so there is a large difference from the manner of the related art shown in FIG. 16.

In order to wire the present invention to a ground type heating film, as shown in FIG. 12, the power inlet plug 12 of the power connector dedicated to a heating film is formed as a plug to which three single-phased interior power lines (an activation line, a neutral line, and a ground line) are connected, a ground electrode 11-1 is included in the first electrode 11 for wiring a heating film, and a ground track is included in the power cable 3 and the power outlet socket 22, thereby configuring a power connector dedicated to a ground type heating film to be exclusively used for a heating film with a ground electrode.

On the other hand, as shown in FIG. 10, when the power outlet socket 22 is independently used or when a plurality of power outlet sockets 22 is connected to be used, the last one necessarily remains not connected.

In this case, as shown in FIGS. 10 and 11, since there is a possibility of an electrical safety accident at the power outlet socket 22, the female connector 2 further includes a cap plug 6 that is inserted in the power outlet socket 22.

Accordingly, when there is no longer a male connector 1 to be coupled to the female connector 2, an electrical safety accident can be prevented by inserting the cap plug in the power outlet socket 22.

Meanwhile, the male connector 1 and the female connector 2 may be formed, as shown in FIG. 13, by fixing electrodes to a PCB through soldering, putting them in a mold, and then forming them with heat resistant resin such as PVC. For the convenience, as shown in FIG. 13, only the structure of the male connector 1 is described. This is equally applied to the female connector 2, so repeated description is omitted. As shown in the figure, wires of the power cable 3 and the electrode terminals of the first electrode 11 for wiring a heating film and the second electrode 21 for wiring a heating film are all disposed on a PCB at the center and fixed through soldering 15. Further, the wires of the power cable 3 and the electrode terminals of the first electrode 11 for wiring a heating film and the second electrode 21 for wiring a heating film are also connected to each other by soldering 15. Further, in electrical connection using a PCB, when they overlap each other, that is, cross each other, they are connected without overlapping each other by using both the front and rear sides of the PCB. When soldering is finished, it is put into a mold and molded with heat resistant resin such as PVC, thereby forming the male connector 1 shown in FIG. 3.

However, according to a power connector dedicated to a heating film having the male connector 1 and the female connector 2 manufactured by the PCB and soldering, the manufacturing process is very complicated and is performed manually by workers, so the soldered thickness may not be uniform. When the soldered thickness is not uniform, the amount of a current depends on the thicknesses of the soldered portions, so heat may be generated due to excess current. Further, there is a problem in that it is difficult to make a connector thin due to this manufacturing manner.

Accordingly, the present invention does not exclude that the structures of the male connector 1 and the female connector 2 are formed without using the PCB. Hereafter, for the convenience, as shown in FIG. 14, only the structure of the male connector 1 is described. This is equally applied to the female connector 2, so repeated description is omitted. As shown in FIG. 14, a straight metal terminal having a socket at a side in which the wires of the power cable 3 are inserted and fixed and a T-shaped metal terminal having a socket at a side in which the wires of the power cable 3 are inserted and fixed are prepared and arranged, as in the figure. In this process, overlapping portions of the metal terminals 11 and 12 are bent to be stepped so that they do not make a short circuit, as shown in the figure. By bending them to avoid each other, the male connector 1 can be made thin. Further, it is more preferable in terms of safety to dispose an insulator 60 between the metal terminals 11 and 12 at the overlapping portions of the metal terminals 11 and 12 in order to increase insulation between the metal terminals 11 and 12 overlapping each other. Thereafter, they are put into a mold and molded with heat resistant resin such as PVC, thereby forming the male connector 1 shown in FIG. 3.

In this configuration, the insulator 60 may be a silicon or nylon resin insulator having heat resistance of 200° C. or more, but the material is not limited thereto and any material can be used as long as it secures insulation between metals and has heat resistance.

Meanwhile, another embodiment of the present invention is shown in FIG. 15. As shown in the figure, one of copper electrodes 50 on both sides of a heating film 5 is extended from the lower end of the heating film 5 close to the other copper electrode.

Further, a female connector that has two electrodes for wiring a heating film formed on the upper side, a power inlet plug 12 formed on the lower side, and a power outlet socket 22 on each of the left and right sides is prepared, and the electrodes for wiring a heating film are connected respectively to the copper electrode 50 of the heating film 50.

A plurality of heating films 5 with the female connector 20 connected thereto is prepared, as shown in FIG. 15.

Further, a power connector having a male connector, which has a power inlet plug 12 on a side and a power cable 3 on the other side, at both ends of the power cable 3 is prepared. That is, a male connector-dedicated connector composed of male connectors is prepared.

As described above, the heating film 5 is connected to the power socket 7 extending from the controller 70 connected to the interior plug 71, thereby being supplied with power. As in the present embodiment, the heating film 5 having the female connector 20 connected thereto is supplied with power by connecting the power inlet plug 12 disposed on the lower side of the female connector 20 to the power socket 7. However, as shown in FIG. 15, in the present embodiment, the heating films 5 are all connected to the female connector 20, a power can be connected to the heating film 5 closest to the controller 70.

Further, as shown in the figure, the male connector-dedicated power connectors are respectively connected to the power outlet sockets 22 on the left and right sides of the female connector 20 having the power socket 7 connected thereto to be connected to the female connectors 20 of adjacent heating films 5, thereby supplying power to adjacent heating films 5.

According to the present embodiment, since it is possible to connect power to the heating film 5 positioned closest to the controller 70, a limit due to the position of the controller 70 is removed, so there is no need of a long wire. Further, power can be continuously supplied to an adjacent heating film 5 through the male connector-dedicated power connector from the female connector 20 of the heating film 5 supplied with the power, which enables simpler construction.

Further, since the power inlet plugs 12 of the female connectors other than the female connector 20 directly connected to the power socket 7 are exposed, the female connectors 20 further include a protective cap 60 covering the power inlet plug 12. Accordingly, an electric leak accident is prevented by covering the exposed power inlet plugs 12 of the female connectors other than the female connector 20 directly connected to the power socket 7 with the protective caps 60.

The drawings shown to describe the present invention are examples for implementing the present invention, and as shown in the figures, various combinations are possible to achieve the spirit of the present invention.

Accordingly, the present invention is not limited to the embodiments and may be changed in various ways by those skilled in the art without departing from the scope of the present invention, which should be construed as being included in the spirit of the present invention.

What is claimed is:

1. A power connector dedicated to a heating film, the power connector comprising:
   a male connector (1) formed in a rectangular thin plate shape, having a power inlet plug (12) formed as a thin plate-shaped electrode on a right side thereof, having a first electrode (11) for wiring a heating film formed as a thin plate-shaped electrode on an upper side, and having a left side to which a power cable (3) internally wired to the power inlet plug (12) is connected; and a female connector (2) formed in a rectangular thin plate shape, having a right side to which the power cable (3) is connected, having a second electrode (21) for wiring a heating film formed as a thin plate-shaped electrode on a right side thereof, and having a power outlet socket (22) wired to the power inlet plug (12), wherein the power cable (3) is adjusted in length in accordance with a distance of a copper electrode (50) of the heating film and is wired in a plane shape to the copper electrode (50) of the heating film that is constructed flat, and power is connected to a plurality of sequential heating films (5) by continuously maintaining connection of the male connectors (1) and the female connectors (2).

2. The power connector dedicated to a heating film of claim 1, wherein a heating film mounting slot (40) in which the heating film (5) is fitted to set a coupling position is formed on an upper side of each of the female connector (2) and the male connector (1), so the heating film (5) is inserted into the heating film mounting slot (40) and an electrode coupling position is determined, and then the first electrode (11) for wiring a heating film and the second electrode (21) for wiring a heating film are wired to the cooper electrode (50) of the heating film.

3. The power connector dedicated to a heating film of claim 2, wherein the first electrode (11) for wiring a heating film and the second electrode (21) for wiring a heating film are formed as thin plate-shaped electrodes with a through-hole (210) at an end, are inserted to be connected to the copper electrode (50) of the heating film by opening laminating films 51 and 52 of the heating film, and then are fixed together with the heating film (5) in the through-holes (210) by a hole tack (8), thereby being wired to the cooper electrode (50) of the heating film.

4. The power connector dedicated to a heating film of claim 1, wherein the power connector dedicated to a heating film is exclusively used for a ground type heating film by forming the power inlet plug (12) as a plug to which three single-phased interior power lines (an activation line, a neutral line, and a ground line) are connected, forming the first electrode (11) for wiring a heating film to include a ground electrode (11-1), and forming the power cable (3) and the power outlet socket (22) to include a ground track.

5. The power connector dedicated to a heating film of claim 1, wherein the female connector (2) further includes a cap plug (6) inserted in the power outlet socket (22), so when there is not male connector (1) of another power connector (2) to be coupled to the female connector (2), electrical safety is performed by inserting the cap plug (6).

6. The power connector dedicated to a heating film of claim 1, wherein the male connector (1) and the female connector (2) are each manufactured by fixing the first electrode (11) or second electrode (21) for wiring a heating film, wires of the power cable (3), and electrode terminals of the power inlet plug (12) to a PCB through soldering (15), electrically connecting the wires and the electrode terminals to a front side and/or a rear side of the PCB through soldering (15), and then putting them into a mold to be formed with heat resistant resin, or by preparing and arranging one or more straight metal terminals having a socket at a side in which the wires of the power cable (3) are inserted and fixed and/or a T-shaped metal terminal having a socket at a side in which the wires of the power cable (3) are inserted and fixed, by bending overlapping portions of the metal terminals (11, 12) to be stepped so that they do not make a short circuit, by disposing an insulator (60) between the metal terminals (11, 12) at the overlapping portions of the metal terminals (11, 12), and then by putting them into a mold to be formed with heat resistant resin.

7. A power connector dedicated to a heating film, the power connector comprising:

a male connector-dedicated connector formed in a rectangular thin plate shape, having two male connectors (1) that have a power inlet plug (12) formed as a thin plate-shaped electrode on a side thereof, that have the other side to which a power connector (3) internally wired to the power inlet plug (12) is connected, and that are disposed at both ends of the power cable (3);

a female connector (20) formed in a rectangular thin plate shape, having two electrodes for wiring a heating film formed as thin plate-shaped electrodes on an upper side thereof, having a power outlet socket (22) coupled to the power inlet plug (12) on each of a left side and a right side, and having a power inlet plug internally wired to the electrodes for wiring a heating film and formed as a thin plate-shaped electrode, wherein the two electrodes for wiring a heating film of the female connector (20) are respectively wired in a plate shape to cooper electrodes 50 formed on both sides of heating films (5) that are constructed flat, the female connector (20) is connected to each of the heating films (5), main power is supplied to the power inlet plug of a female connector (20) connected to any one heating film (5) selected from the heating films (5) that are arranged, and power is sequentially connected to the heating films (5) that are arranged by the power inlet plug (12) of the male connector-dedicated connector to each of the power outlet sockets (22) formed on left and right sides of each of the female connectors (20).

8. The power connector dedicated to a heating film of claim 7, wherein the female connector (20) further includes a protective cap (60) that covers the power inlet plug (12), so when there is no power socket (7) to be coupled to the power inlet plug (12) of the female connector (20), electrical safety is performed by covering the power inlet plug (12) of the female connector (20) with the protective cap (60).

\* \* \* \* \*